US012703654B2

(12) United States Patent
Jud et al.

(10) Patent No.: US 12,703,654 B2
(45) Date of Patent: Aug. 11, 2026

(54) METHOD AND APPARATUS FOR THE HOT FORMING OF GLASS WORKPIECES, AND HOT-FORMED GLASS CONTAINER

(71) Applicant: SCHOTT Pharma Schweiz AG, St. Gallen (CH)

(72) Inventors: Xaver Jud, Neukirch a.d. Thur (CH); Robert Lee, Suzhou City (CN); Sherry Jiang, Suzhou City (CN)

(73) Assignee: SCHOTT Pharma Schweiz AG, St. Gallen (CH)

( * ) Notice: Subject to any disclaimer, the term of this patent is extended or adjusted under 35 U.S.C. 154(b) by 685 days.

(21) Appl. No.: 18/078,505

(22) Filed: Dec. 9, 2022

(65) Prior Publication Data

US 2023/0106814 A1 Apr. 6, 2023

Related U.S. Application Data

(62) Division of application No. 16/601,981, filed on Oct. 15, 2019, now Pat. No. 11,565,961.

(30) Foreign Application Priority Data

Oct. 19, 2018 (DE) ..................... 10 2018 126 053.9

(51) Int. Cl.
*C03B 13/16* (2006.01)
*C03B 9/193* (2006.01)
(Continued)

(52) U.S. Cl.
CPC ............ *C03B 13/16* (2013.01); *C03B 23/095* (2013.01); *C03B 9/193* (2013.01); *C03B 13/18* (2013.01); *C03B 2215/50* (2013.01)

(58) Field of Classification Search
CPC ....... C03B 13/16; C03B 23/095; C03B 9/193; C03B 13/18; C03B 2215/50
(Continued)

(56) References Cited

U.S. PATENT DOCUMENTS 1,501,773 A 7/1924 Headley et al.
1,643,215 A 9/1927 Koenig
(Continued)

FOREIGN PATENT DOCUMENTS

CN 104291558 A 1/2015
CN 105921519 A 9/2016
(Continued)

OTHER PUBLICATIONS

German Office Action dated May 15, 2019 for German Application No. DE 10 2018 126 053.9 (10 pages).
(Continued)

*Primary Examiner* — Orlando E Aviles
*Assistant Examiner* — Niki M Eloshway
(74) *Attorney, Agent, or Firm* — TAYLOR & EDELSTEIN, PC

(57) ABSTRACT

A hollow glass article is a container or part of a vessel having a neck or shoulder region and a wall. The glass article encompasses the wall and the neck or shoulder region of the container. The wall has a round or oval cross section and the container has a characteristic surface region on an outer glass surface of the hollow glass article. The following applies for a ratio between a mean tangential gradient value and a mean axial gradient value in the characteristic surface region: mean tangential gradient value/mean axial gradient value <0.6.

15 Claims, 6 Drawing Sheets

(51) Int. Cl.
*C03B 23/09* (2006.01)
*C03B 13/18* (2006.01)

(58) Field of Classification Search
USPC .......................................................... 215/40
See application file for complete search history.

(56) References Cited

U.S. PATENT DOCUMENTS

| | | | |
|---|---|---|---|
| 1,906,617 A | 5/1933 | Key | |
| 1,914,205 A | 6/1933 | Hopper et al. | |
| 2,266,417 A | 12/1941 | Eisler | |
| 2,446,000 A | 7/1948 | Eisler | |
| 3,171,730 A | 3/1965 | Zauner | |
| 3,342,575 A | 9/1967 | Dichter | |
| 3,343,937 A | 9/1967 | Lewis | |
| 3,362,435 A | 1/1968 | Meyer | |
| 3,424,570 A | 1/1969 | Couquelet | |
| 4,578,099 A | 3/1986 | Hübner et al. | |
| 5,252,115 A | 10/1993 | Mannl et al. | |
| 5,300,134 A | 4/1994 | Männl et al. | |
| 6,640,587 B1 | 11/2003 | Hollesen et al. | |
| 7,390,240 B2 | 6/2008 | Ghosh et al. | |
| 9,422,187 B1 * | 8/2016 | Bankaitis | C03B 19/1492 |
| 10,773,989 B2 | 9/2020 | Gaylo et al. | |
| 11,565,961 B2 | 1/2023 | Jud et al. | |
| 11,634,352 B2 | 4/2023 | Glacki et al. | |
| 2006/0267250 A1 * | 11/2006 | Gerretz | B29C 43/36 425/547 |
| 2011/0111945 A1 * | 5/2011 | Peterson | C04B 35/5626 264/432 |
| 2011/0274843 A1 | 11/2011 | Grittner et al. | |
| 2012/0302063 A1 * | 11/2012 | Markham | B24B 1/00 438/692 |
| 2017/0022088 A1 | 1/2017 | Witte et al. | |
| 2017/0119967 A1 | 5/2017 | Witte et al. | |
| 2018/0029918 A1 * | 2/2018 | Hunzinger | C03B 23/043 |
| 2018/0354838 A1 * | 12/2018 | Wu | C09D 4/06 |
| 2019/0047892 A1 * | 2/2019 | Ono | C03C 15/00 |
| 2019/0144326 A1 | 5/2019 | Glacki et al. | |
| 2019/0161380 A1 | 5/2019 | Gaylo et al. | |
| 2021/0309555 A1 * | 10/2021 | Trinks | C03C 3/093 |
| 2022/0024799 A1 * | 1/2022 | Moriuchi | C03B 23/095 |
| 2022/0089479 A1 * | 3/2022 | Azuma | C03C 23/0025 |

FOREIGN PATENT DOCUMENTS

| | | | |
|---|---|---|---|
| DE | 45584 | C | 3/1888 |
| DE | 46337 | C | 3/1888 |
| DE | 20 2004 004 560 | U1 | 8/2004 |
| JP | 04021531 | A | 1/1992 |
| JP | 2016-060674 | A | 4/2016 |

OTHER PUBLICATIONS

Machine translation of German Office Action dated May 15, 2019 for German Application No. DE 10 2018 126 053.9 (8 pages).
India Office Action dated Aug. 12, 2022 for India Application No. 201914042446 (6 pages).
Chinese Office Action dated Sep. 8, 2022 for Chinese Patent Application No. 201910994786.6 (6 pages).
European Office Action dated Jun. 8, 2020 for European Application No. 19 19 7214 (7 pages).

* cited by examiner 82 21 30
60 40 β 90
82 22 40
60 30 21 90
82 21 40
60 22 90
21 α
82
60 22 40 91 90
21 23
82 40
60 22 31 90

METHOD AND APPARATUS FOR THE HOT FORMING OF GLASS WORKPIECES, AND HOT-FORMED GLASS CONTAINER

CROSS-REFERENCE TO RELATED APPLICATIONS

This is a division of U.S. patent application Ser. No. 16/601,981, entitled "METHOD AND APPARATUS FOR THE HOT FORMING OF GLASS WORKPIECES, AND HOT-FORMED GLASS CONTAINER," filed on Oct. 15, 2019, the entirety of which is incorporated herein by reference.

BACKGROUND OF THE INVENTION

1. Field of the Invention

The invention relates to a method and an apparatus for molding glass workpieces in a hot process. Specifically, the invention relates to a method and an apparatus for a corresponding forming process that make it possible to increase the production of articles by extending cleaning intervals. Furthermore, the invention relates to hollow glass articles.

2. Description of the Related Art

Methods are known from the prior art in which glass articles are produced by a forming process from a workpiece, also referred to as a semi-finished product. Thus, glass vials are produced for example for pharmaceutical applications from a glass tube, in that a short tubular section at one end is heated to the shaping temperature of the glass and is brought into the desired shape in one or more shaping steps by suitable molding tools. The internal geometry is usually formed with mandrels that are introduced into the tube end. The workpiece rotates during the shaping process. The shape and dimensions of the mandrel define the internal geometry of the glass vial. The forming takes place by way of outer molding tools that press the glass tube against the mandrel and simultaneously shape the outer side of the glass tube. In the process, the glass tube and the outer molding tool rotate. The outer molding tool comprises a shaping roller having a shaping surface.

Thus, DE 202004004560 U1 describes a method and an apparatus for hot forming having shaping rollers that are mounted in a freely rotatable manner. The shaping rollers are driven by the rotating workpiece and rotate synchronously with the glass, i.e. there is no relative movement between the glass and the shaping rollers.

Preferably, the forming takes place on what is known as a rotary indexing machine. The forming can in this case take place in several steps, i.e. at several stations of the rotary installation.

During tool contact, the glass workpiece is cooled by the molding tools. Between the molding steps, the workpieces may therefore need to be reheated. The temperature control is configured such that, after the last shaping step, the glass reaches a temperature at which the workpiece is dimensionally stable.

As a result of the contact with the hot glass, the molding tools, in particular the shaping surfaces of the shaping rollers, are exposed to high temperature loads. The glass can exhibit temperatures of up to 1000° C. in this case. During the forming process, the shaping surfaces thus heat up and can exhibit temperatures of >250° C.

In addition, direct contact of the molding tools with the hot glass must be avoided, since this leads to the glass sticking to the surface of the molding tools. Therefore, in the above-described hot forming of glass, use is generally made of a lubricant, also referred to as release agent, for example an oil or a paste. In this case, the lubricant is applied to the molding tools in the intermediate phases of the molding process, in which the tools do not have any glass contact, for example in that the lubricant is sprayed onto, splashed onto or washed over the molding tools. In the process, the respective tool is lubricated again before any glass contact.

On account of the high temperatures, reaction products of the lubricant arise during the forming process. Thus, soot is formed. During operation, soot deposits thus build up on the shaping surfaces of the shaping roller. This is problematic, since the soot comes into contact with the hot glass and can thus be incorporated into the moldable glass or can bond with the glass. This causes considerable cosmetic problems. In the production of glass vials, this results for example in contamination in the region of the formed bottle neck. The glass vials in question have to be discarded.

In addition to soot contamination, the contours of irregular soot deposits on the shaping rollers can be transferred to the glass. The irregularities are impressed on the glass surface as arises in the case of a die, and this likewise results in cosmetic defects and thus to rejection of the vials in question. Furthermore, inclusions of lubricating oil can also occur between the glass surface and the rotating shaping rollers. The included oil film is trapped between the glass surface and tool surface during the rolling operation and thus impresses a pattern on the still deformable glass surface. In the end product, this results in a speckle-like structure with varying heights on the glass surfaces on question. In this case, there is no fundamental difference in the formation of the pattern as regards the direction, i.e. there is no fundamental difference between the form of the pattern in the direction of rotation, i.e. tangentially, and the form of the pattern in the direction of the axis of rotation, i.e. axially.

Therefore, the molding tools have to be cleaned in a suitable cleaning interval. Typically, this interval is 2 to 3 hours. In this case, in order to clean the shaping rollers, it is necessary to stop the production machine, resulting in a production shortfall. Moreover, as a result of the production machine being stopped, start-up problems can occur, and so the production process is impaired beyond the down time.

SUMMARY OF THE INVENTION

Exemplary embodiments disclosed herein provide an apparatus for producing a glass article with a defined internal and external geometry, which does not have the above-described drawbacks of the prior art.

In some exemplary embodiments provided according to the invention, a hollow glass article is a container or part of a vessel having a neck or shoulder region and a wall. The glass article encompasses the wall and the neck or shoulder region of the container. The wall has a round or oval cross section and the container has a characteristic surface region on an outer glass surface of the hollow glass article. The following applies for a ratio between a mean tangential gradient value and a mean axial gradient value in the characteristic surface region: mean tangential gradient value/mean axial gradient value <0.6.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
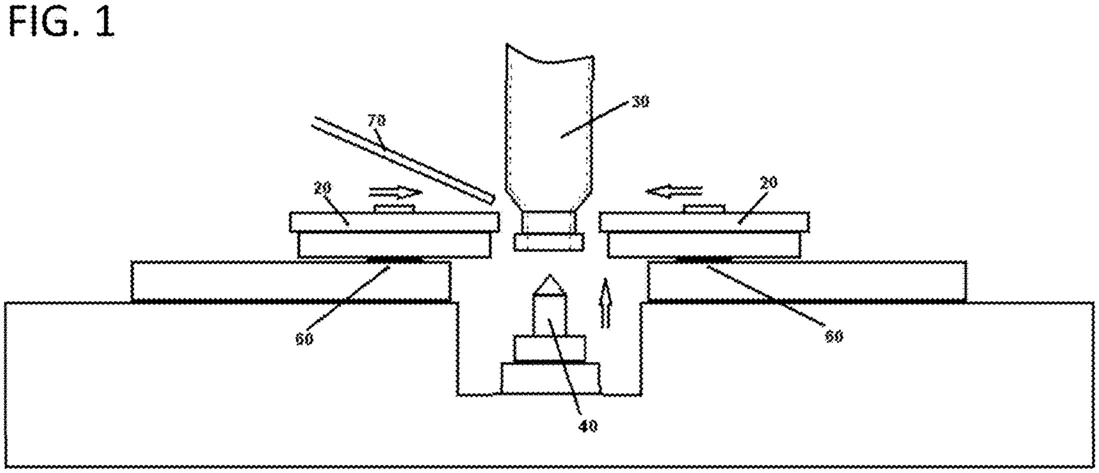
FIG. 1 illustrates a schematic side view of an apparatus known from the prior art for hot forming.

In some exemplary embodiments, an apparatus provided according to the invention includes: a device configured to heat a glass until it softens, a molding station having at least an inner and an outer molding tool for molding the workpiece, the outer molding tool including a shaping roller with a shaping surface and serves for molding the outer lateral surfaces of the workpiece, and an apparatus configured to accommodate the shaping roller and an apparatus configured to apply a lubricating oil to the shaping surface of the shaping roller, having an outlet opening for dispensing the lubricating oil. The shaping roller is mounted in a freely rotatable manner in the accommodating device and is firmly fixable or fixed during the shaping process by a lockable locking device.

The shaping of the workpiece into the specific shape or into the specific dimensions of the desired product can in this case be a direct result of the molding process. In particular, the rolled rim or the outer surface of the rolled rim in the case of vials or carpules or, in the case of syringes, the outer surface of the syringe cone can be molded by the method provided according to the invention.

Shaping of the workpiece into the product form can, however, also be achieved by several, different molding processes. In addition to the inner and outer lateral surfaces of the workpiece, it is possible, for example, in the production of glass bottles, glass vials or glass containers also to shape the neck and vial-mouth geometry.

With the apparatus provided according to the invention, the cleaning intervals can be extended considerably. At the same time, the production-related scrap is reduced. This is ensured by the individual components of the apparatus.

The apparatus is configured in particular for molding a tubular workpiece. Here, the inner and outer lateral surfaces are determined essentially by the geometry of the tube. In some embodiments, the inner molding tool is in the form of a mandrel. An apparatus of the type in question is suitable in particular for the production of glass containers such as primary pharmaceutical packaging, for example vials, carpules or syringes, by forming glass tubes.

Because the outer shaping roller is fixed, it is not driven or set in rotation by the rotating workpiece during the forming operation. Therefore, there is relative movement between the outer shaping roller and the workpiece. As a result of this relative movement, shear forces act on the workpiece. Surprisingly, it has been found that this does not have a negative effect on the quality of the formed workpieces given sufficient lubrication of the shaping roller. Rather, it has been found that the shear forces have a positive effect. Thus, the material to be deformed is guided to the molding tools and pressed against the latter by the shear forces, this in turn making it easier to shape the workpiece.

The locking of the shaping roller takes place with a releasable connection, such that the shaping roller can be released between the individual shaping processes and be rotated through an angle $\alpha$ in the locking device. In some embodiments, the angle $\alpha$ can be predefined. The rotation of the shaping roller through the angle $\alpha$ between the hot forming processes thus has the result that the subsequent hot forming operation takes place by way of an adjacent surface portion of the shaping surface. Thus, only a small portion of the surface of the shaping roller is used per formed workpiece. As a result of the shaping roller being rotated between the individual shaping steps, uniform wear of the shaping surface over the entire surface of the shaping roller is ensured.

A further advantage of the locking device provided according to the invention is that, as a result of the shaping roller being rotated between the individual shaping processes, a cold point of the molding tool is used in each shaping process or for each workpiece to be formed. Thus, the shaping roller heats up only very little, if at all, during production. This is particularly advantageous since in this way soot formation as a result of combustion or pyrolysis of the lubricating oil can be reduced considerably. In addition, the wear of the molding tool is also reduced, and so the service life of the molding tool can be increased.

The apparatus has an apparatus for applying the lubricating oil to the shaping surface of the shaping roller. In this case, the lubricating oil is always applied only to a subregion of the shaping surface per application operation. In some embodiments, lubricating oil is applied to a part of the shaping roller in each cycle.

In some embodiments, the apparatus for dispensing the lubricating oil is installed fixedly in the apparatus, i.e. the distance from the spray nozzle to the surface of the molding tool to be sprayed is constant. In this case, the spray nozzle, for example, can be integrated into the molding station or an outer molding tool. Application beneath an outer molding tool is also possible.

In some embodiments, the lubricating oil is applied by a drip-feed lubricator. Drip-feed lubricators with automatic, regular oil dispensing have proven to be advantageous.

In some embodiments, the apparatus for applying the lubricating oil is positioned in the apparatus such that the outlet opening of the apparatus for applying the lubricating oil and the molding tool are arranged at an angular distance of at least 45° about the axis of rotation of the workpiece. Thus, only little lubricating oil is in contact with the hot glass. In some embodiments, the angle $\beta$ is in the range from 90 to 270°, such as in the range from 160 to 200°, i.e. the apparatus for applying the lubricating oil is arranged in the apparatus on the opposite side from the glass engagement.

In some embodiments, the quantity of oil dispensed per application is in the range from 0.01 to 0.1 g, such as in the range from 0.03 to 0.05 g. As a result of the small quantity of applied lubricant, the contamination of the product, of the molding tools and of the production environment can be reduced considerably. At the same time, however, a sufficient lubricating effect is achieved in the apparatus provided according to the invention.

Any oils having a viscosity $<600\ mm^2/s$ and a flash point and/or pyrolysis point >200° C., such as >250° C. can be used as lubricant in the apparatus provided according to the invention. Thus, the same oils can be used here as in the known standard processes.

The apparatus is configured in particular for molding a tubular workpiece. Here, the inner and outer lateral surfaces are determined essentially by the geometry of the tube. In some embodiments, the inner molding tool is in the form of a mandrel. An apparatus of the type in question is suitable in particular for the production of glass containers such as primary pharmaceutical packaging, for example vials, carpules or syringes, by forming glass tubes.

The shaping roller has a rotationally symmetric cross-sectional area. In some embodiments, the shaping roller has a cylindrical cross section in a center plane perpendicular to the axis of rotation of the shaping roller. In this embodiment, the shaping roller is thus round. This has the advantage that, in step c), the angle through which the shaping roller is rotated can be selected freely, or it is not necessary to precisely set the angle of rotation $\alpha$.

Alternatively, the shaping roller has a polygonal cross section in a center plane perpendicular to the axis of rotation of the shaping roller, having a plurality of shaping surfaces. In shaping rollers having a polygonal cross section, the angle of rotation $\alpha$ to be observed in step c) is dependent on the number of shaping surfaces. In some embodiments, the shaping roller has 6 to 18 shaping surfaces.

The edges of the shaping surfaces may be formed in a planar, convex or concave manner.

As a result of the shaping roller being rotated according to the invention after each shaping process, a cold point of the molding tool is used for each workpiece to be formed and the shaping roller heats up only a little as a whole during production. In some embodiments, the apparatus has an additional device for cooling the shaping roller. The cooling can in this case take place by active or passive heat conduction.

In some embodiments, the apparatus has a cooling element, which is connected directly or indirectly to the apparatus for accommodating the shaping roller. The shaping roller is in thermal contact with a cooling element, wherein the cooling element may have an element for internal cooling, such that process heat can be dissipated. The coolant is in this case in contact with the shaping roller only indirectly via the cooling element.

Alternatively or additionally, the apparatus has air cooling for cooling the shaping roller.

In some embodiments, the apparatus is configured such that, by heat dissipation, the temperature at the surface of the molding tool is at most 250° C., such as at most 180° C. or at most 100° C. In this case, the surface of the molding tool is understood to be in particular the part of the molding tool that comes into contact with the hot glass during the forming process. The surface temperature of the shaping rollers is in this case measured sporadically with the aid of a surface contact thermometer directly next to the glass contact point. As a result of the low temperatures, virtually no oil is combusted and so the soot development is significantly reduced and no or only very small amounts of combustion residues are deposited on the shaping surface of the shaping roller.

The apparatus provided according to the invention may have a cleaning interval of at least 8 h or even at least 12 h. The cleaning interval is understood here to be the time between two down times of the apparatus for the cleaning of the molding tools.

Furthermore, the invention relates to a method for molding a glass workpiece with fixed shaping rollers. Here, the method comprises at least the method steps a) to c), with step a) heating the workpiece until it softens, with step b) shaping the outer and inner surfaces of the workpiece by at least one molding tool having a shaping roller in at least one molding step, and with step c) releasing the locking device, rotating the shaping roller through a predefined angle $\alpha$ and fixing the shaping roller again such that, when steps a) and b) are repeated, a different part of the shaping surface of the shaping roller comes into contact with the workpiece. The workpiece may be formed in this case by an inner and an outer molding tool. In some embodiments, the workpiece is in the form of a tube, in particular of a tube with a round or ellipsoidal cross section. In particular, neck or rolled-rim regions for example of vials, carpules or syringes can be produced with the method provided according to the invention.

In step a), the workpiece is first of all heated up to a temperature around the shaping temperature of the glass used, and in step b) it is molded in contact with the molding tool. In some embodiments, in step b), for shaping, an inner molding tool is introduced into the workpiece and an outer molding tool is applied to the workpiece, such that the workpiece is molded. The inner molding tool may be in this case in the form of a mandrel. The outer molding tool has at least one shaping roller with at least one shaping surface. The shaping roller is in this case fixed to an accommodating apparatus by a releasable locking device.

The workpiece is positioned on an inner molding tool and executes a rotation about its center point. Since the shaping roller of the outer shaping tool is fixed, the shaping roller does not rotate and so there is a relative movement between the shaping surface and the workpiece during the molding operation. At least the part of the shaping surface that comes into contact with the workpiece during the molding operation is covered with an oil as lubricant, such that any sticking of the glass to the shaping surface is avoided.

The application of oil to the subregion of the shaping surface that forms the contact surface with the glass in step b) takes place during one of method steps a) to c). In this case, oil is applied to a part of the shaping surface that is not in contact with the workpiece at the time the oil is applied. In some embodiments, in each cycle, lubricating oil is applied to a part of the shaping surface of the shaping roller. Drip-feed lubricators, in particular drip-feed lubricators with automatic, regular oil dispensing have proven to be particularly advantageous here. In some embodiments, 0.01 to 0.1 g, such as 0.03 to 0.05 g of oil is applied to the shaping roller in each oil dispensing operation.

In step c), the locking device is released. The shaping roller is rotated through an angle α and subsequently fixed in the locking device again. In some embodiments, the angle α is predefined, i.e. the shaping roller is rotated though a previously set angle α. Step c) thus ensures that, when steps a) and b) are repeated, a different part of the shaping surface of the shaping roller comes into contact with the workpiece. Thus, heating up of the entire shaping roller is avoided and a cold shaping surface is available for each shaping operation. As a result, soot development is reduced considerably.

In some embodiments, the surface temperature of the shaping surface that forms the contact surface with the glass during the shaping process is at most 250° C., such as at most 180° C. or at most 100° C. during the forming process, i.e. even upon contact with the heated workpiece.

In this case, the shaping roller can be cooled during the shaping process. In particular, heat can be dissipated from the shaping roller during the shaping process by heat conduction.

In some embodiments, the heat dissipation takes place passively by heat dissipation. In this case, the shaping roller is in contact with a cooling element. The cooling element can in this case exhibit active cooling. Thus, in one development, the cooling element is flushed with a cooling medium, such as with a cooling liquid.

Alternatively or additionally, the part of the shaping surface that is in contact with the workpiece to be formed is cooled by blowing in a gas stream, such as by blowing in an air stream.

In some embodiments, in step b), the outer lateral surfaces of the workpiece are molded with a shaping roller having a circular cross-sectional area. In this embodiment, the shaping roller may be rotated through an angle α in the range from 2 to 10°, such as through an angle α in the range from 3 to 5°, in step c).

Alternatively, the shaping roller has a polygonal cross-sectional area. In some embodiments, the shaping roller has a polygonal cross-sectional area with 6 to 18 shaping surfaces, wherein the number of shaping surfaces is fixed by the number of polygon sides.

In some embodiments, after step c), a step d) for cleaning the shaping roller takes place. In this case, the shaping process is stopped and the shaping roller is cleaned during the down time. In some embodiments, the cleaning step takes place at the earliest after 10 000 repetitions of steps a) to c), i.e. at the earliest after 10 000 formed workpieces. Alternatively, the cleaning step d) takes place at the earliest after a running time of the apparatus of 4 h, such as 8 h, 15 h or 24 h. Thus, the duration of the cleaning interval can be extended considerably. In some embodiments, the running time between two cleaning steps d) is greater than 24 h.

In some embodiments, after step c), a cleaning step e) for cleaning the shaping roller during a repetition of steps a) to c) with new workpieces takes place. Thus, the cleaning takes place during the ongoing process. It is therefore not necessary to interrupt the production process. Here, in each case only a part of the shaping surface, such as the part of the shaping surface that was in contact with the workpiece during the preceding step b), is cleaned. Cleaning of the shaping roller may take place after each shaping process with steps a) to c).

Furthermore, the invention relates to a hollow glass article that is produced or producible by the method provided according to the invention. The glass article is in this case a container or part of a container and comprises the wall of the container and a neck or shoulder part. The hollow glass article is at least partially cylindrical with a circular or oval cross-sectional area.

The outer surfaces of the container have a characteristic surface structure at the points that were exposed to increased pressure during the production process and were shaped an outer and an internal molding tool, for example in the form of a mandrel. These surface regions of the outer surface of the container are also referred to as characteristic surface regions in the following text. The characteristic surfaces should be understood, within the meaning of the invention, as being in particular the surface regions of the outer glass surfaces that were molded in a shaping step using an internal mandrel and outer molding tools. In some embodiments, the shaping step for molding the characteristic surface regions is the last shaping step within the entire shaping method for producing the container in question.

In some embodiments, the container is a vial or a carpule. Here, the characteristic surface region should be understood as being the outer surface of the rolled rim. In some embodiments, the container is a syringe. In such embodiments, the characteristic surface region is understood as being the outer surface of the cone.

The characteristic surface regions of the container have in this case a surface structure with a height relief with anisotropy of the gradients in the height profile. The height profile has in this case a tangential gradient and an axial gradient.

The tangential gradient is understood here as being the gradient of the height profile in a tangential direction, wherein tangential direction is in this case the designation for the direction of the surface structure that corresponds to the direction of rotation of the workpiece during the molding process. By contrast, the axial gradient is understood as being the gradient of the height profile in the axial direction, i.e. in the direction parallel to the axis of rotation of the workpiece.

The mean value of the tangential gradient, i.e. the mean tangential gradient value, and the mean value of the axial gradient, i.e. the mean axial gradient value, are in this case determined according to the invention from the height profile of the characteristic surface region as follows:

Three measuring fields with a size of 1.0 mm×1.0 mm are placed on the characteristic surface of the container such that the measuring fields are at a tangential distance of 120° from one another and the measuring fields are thus distributed uniformly around the circumference of the characteristic surface region. At the same time, each of the measuring fields is arranged centrally in the axial direction on the characteristic surface region.

On account of the rotationally symmetric or cylindrical shape of the container, each characteristic surface region has a cylindrical curvature in the tangential direction. This cylindrical curvature is automatically corrected after the measurement of the height profile, this being readily possible in the case of a measuring field size of 1.0 mm×1.0 mm. Any systematic curvature, i.e. curvature caused by the shaping of the container, of the characteristic surface region that occurs in the axial direction is also automatically corrected. Thus, influences of the macroscopic container form are not taken into consideration in the determination and evaluation, described below, of the height relief.

The height reliefs of the individual measuring fields in the characteristic surface region can be established with a white light interferometer. In this case, the gradient in the tangential direction and in the axial direction is determined in each case at each point of the height relief within a measuring field. The height relief is subsequently corrected in the axial and circumferential direction computationally in terms of the macroscopic container form. Subsequently, the local gradients are calculated from the particular directional derivative in the tangential or axial direction. In this case, the absolute height values of the surface relief drop out, since the height differences between a trough and a peak are replaced by regions with an approximately constant gradient. Depending on the particular absolute height difference between peak and trough, these constant regions extend to different widths across the measuring field. The mean tangential gradient value and the mean axial gradient value for a measuring field are thus obtained as a value, averaged over the measuring field, of the amount of the local tangential gradient or of the local axial gradient. The corresponding mean gradient values of the individual measuring fields are in term arithmetically averaged, such that the mean tangential gradient value and the mean axial gradient value are determined in an averaged form over the three measuring fields. In this case, in the following text, unless stated otherwise, the mean tangential gradient value and the mean axial gradient value are understood as being the mean gradient value, determined as described above, over the three measuring fields.

The containers provided according to the invention in this case have characteristic surface regions in which the mean tangential gradient value is less than the mean axial gradient value. This can be explained in that, during the production of the container with stationary shaping rollers, in particular during the production method provided according to the invention, the deformable glass surface of the workpiece drags over the stationary tool surface of the outer molding tool and so the film of lubricant or oil located on the surface of the molding tool is scraped off or removed from the glass surface. As a result of the relative movement between the glass surface and tool surface, groove patterns arise, in a similar manner to in a turning process.

In contrast thereto, height profiles of containers that have been produced by a method known from the prior art with moving shaping rollers, exhibit no or at least no pronounced anisotropy as regards the gradients of the height profile depending on the particular directional derivative. The lack of a preferred direction can be explained here by the fact that, in the method known from the prior art, the tool surface rolls on the glass surface of the workpiece in the direction of rotation under increased pressure at the tool contact point, wherein a film of lubricating oil of varying thickness is located between the tool and glass surface. The varying thickness of the film of lubricating oil is impressed onto the still deformable glass surface in the manner of a die during the rolling movement. In this case, there is no or at least no significant difference in the manner in which the pattern forms in the direction of rotation, i.e. tangentially, and in the direction of the axis of rotation, i.e. axially.

Also provided according to the invention is a hollow glass article that is produced or producible by the method provided according to the invention, wherein the glass article is a container or part of a vessel having a neck or shoulder region and a wall, wherein the glass article encompasses the wall and the neck or shoulder region of the container, wherein the wall has a round or oval cross section and the container has a characteristic surface region on the outer glass surface of the hollow glass article, wherein the characteristic surface region has a tangential direction and an axial direction, wherein the tangential direction corresponds to the circumferential direction and the axial direction is perpendicular to the tangential direction, wherein a height profile in the characteristic surface region has in each case a tangential gradient with a mean tangential gradient value and an axial gradient with a mean axial gradient value, wherein the tangential gradient is the gradient of the height profile in the tangential direction and the axial gradient is the gradient of the height profile in the axial direction, and wherein the mean tangential gradient value is determined by integration of the amounts of the local tangential gradient values of the height profile within a measuring field in the characteristic surface region and the mean axial gradient value is determined by integration of the amounts of the local axial gradient values of the height profile within the measuring field in the characteristic surface region.

In some embodiments, the characteristic surfaces of the container have a surface structure with a height relief, wherein the following applies for the ratio between the mean tangential gradient value and the mean axial gradient value: mean tangential gradient value/mean axial gradient value <0.60.

In some embodiments, the following applies for the ratio between the mean tangential gradient value and the mean axial gradient value: mean tangential gradient value/mean axial gradient value <0.45.

In some embodiments, the outer lateral surface has, in the characteristic surface region, a roughness depth $Rz_{axial}$ measured in the direction of the longitudinal axis of the container that is greater than the roughness depth $Rz_{tangential}$ measured at a height of the wall transversely, i.e. in the range from 85 to 95°, such as at 90°, to the longitudinal axis of the container. This portion may have a circumferential score or groove.

The depth of the score or groove can be described by the maximum individual roughness depth $Rz_{axial}$ of the relevant portion. The individual roughness depth $Rz_{axial}$ is in this case determined in accordance with the standard DIN EN ISO 4768:1990.

In some embodiments, the characteristic surface region of the container has at least 2, such as at least 3 circumferential scores. The distance between the individual scores can in this case vary.

In some embodiments, the hollow glass article is a bottle, a vial, part of a syringe or part of a carpule. In particular the hollow glass article is part of primary pharmaceutical packaging, for example a pharmaceutical vial.

Also provided according to the invention is a hollow glass article. The glass article is produced by hot forming a glass tube and/or has along its height a tubular portion with a constant wall thickness, in which portion the standard deviation of the wall thickness is less than 0.05 mm.

Also provided according to the invention is a hollow glass article as described above. The characteristic surface region is located outside the tubular portion, and is located in an end region of the glass article, wherein the diameter of the glass article in the region of the characteristic surface region is less than in the tubular portion.

The glass of the hollow glass article can in particular be a borosilicate glass.

In the following text, exemplary embodiments provided according to the invention are explained in more detail with reference to FIGS. 1 to 17.

Figure 2:
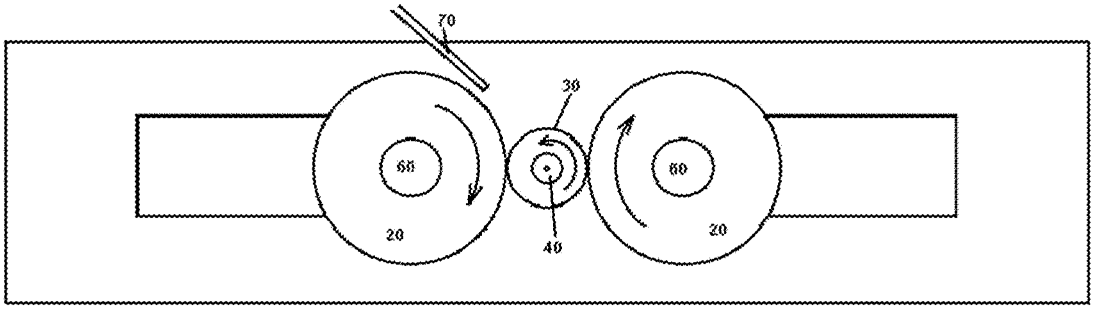
FIG. 2 illustrates a schematic plan view of the apparatus of FIG. 1.

FIGS. 1 and 2 schematically illustrate an apparatus, known from the prior art, for hot forming 1. In this case, FIG. 1 illustrates the side view and FIG. 2 illustrates a plan view. The apparatus has an inner molding tool 40, which forms the inner lateral surface of the glass vial. The outer shaping rollers 20 are mounted in a rotatable manner in the mounting suspension 60. Furthermore, the apparatus has air cooling 70 for cooling the glass tube 30. During the molding process, the glass tube 30 is rotated. The molding tools 40 and 20 move towards the glass tube blank to be molded. Since the outer molding tools 20 are mounted in a rotatable manner, they are likewise set in rotation by the rotary movement of the glass tube 30. Thus, the outer shaping roller 20 and glass tube 30 exhibit no relative movement with respect to one another. Furthermore, during the molding of the outer lateral surface of the glass tube 30, the entire lateral surface of the outer shaping roller 20 passes into contact with the hot glass tube 30. The glass tube is cooled with the aid of air cooling 70.

Figure 3:
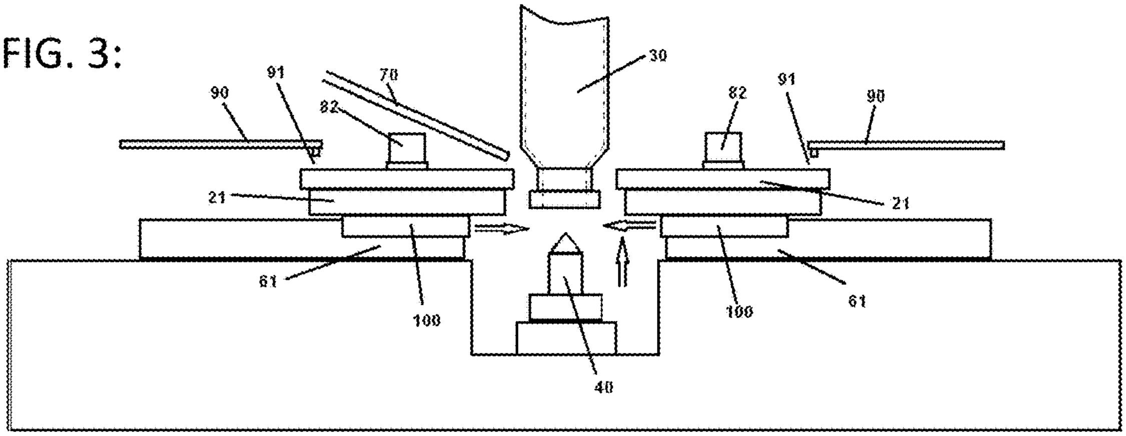
FIG. 3 illustrates a schematic side view of an exemplary embodiment of an apparatus provided according to the invention for hot forming.
Figure 4:
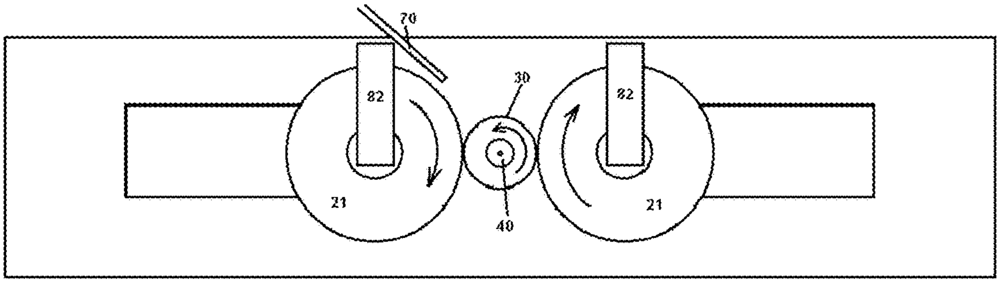
FIG. 4 illustrates a schematic plan view of the apparatus of FIG. 3.

FIGS. 3 and 4 illustrate schematic illustrations of an exemplary embodiment of an apparatus 2 provided according to the invention for hot forming. FIG. 3 in this case illustrates the side view, FIG. 4 illustrates the plan view of the apparatus. The apparatus has an inner molding tool 40 for molding the inner lateral surfaces, and two outer molding tools 21 for molding the outer lateral surfaces of the glass tube 30. The glass tube 30 rotates; the rotary movement is symbolized by the arrow.

The outer molding tools 21 are in the form of shaping rollers having a round cross-sectional area and are mounted so as to be freely rotatable with the aid of the mounting suspension 61. During the forming process, the shaping rollers 21 are fixed by the locking apparatus 82, however, and so rotation of the shaping rollers 21 is not possible. Thus, the shaping rollers 21 are not set in rotation by the rotating glass tube 30, but remain fixed in their position by the apparatus 82. Thus, the glass tube 30 and shaping roller 21 exhibit relative movement with respect to one another. Since the shaping rollers 21 are fixed by the locking mechanism 82 during the forming process, only a small portion of the lateral surface of the shaping rollers 21 comes into contact with the hot glass tube 30, while the rest of the lateral surface of the shaping rollers 21 is not in contact with the glass tube. Thus, only a small part of the lateral surface of the shaping roller 21 serves as the contact surface with the glass tube.

The apparatus 2 provided according to the invention additionally has apparatuses 90 configured to apply lubricants to the outer shaping rollers 21. In this case, the outlet openings of the apparatuses 90 for applying the lubricating oil and the molding tool are arranged at an angular distance of at least 45° about the axis of rotation of the workpiece. This arrangement of the apparatus 90 ensures that the lubricant is not applied to the contact surface of the shaping roller 21 with the hot glass tube 30 but to another, cold region of the shaping roller 21. The apparatus 2 provided according to the invention additionally has, in the embodiment shown, apparatuses 100 configured to cool the shaping rollers. As a result, thermal decomposition of the lubricant can be avoided. This results in less soot formation and thus also in less contamination of the workpiece.

Figure 5:
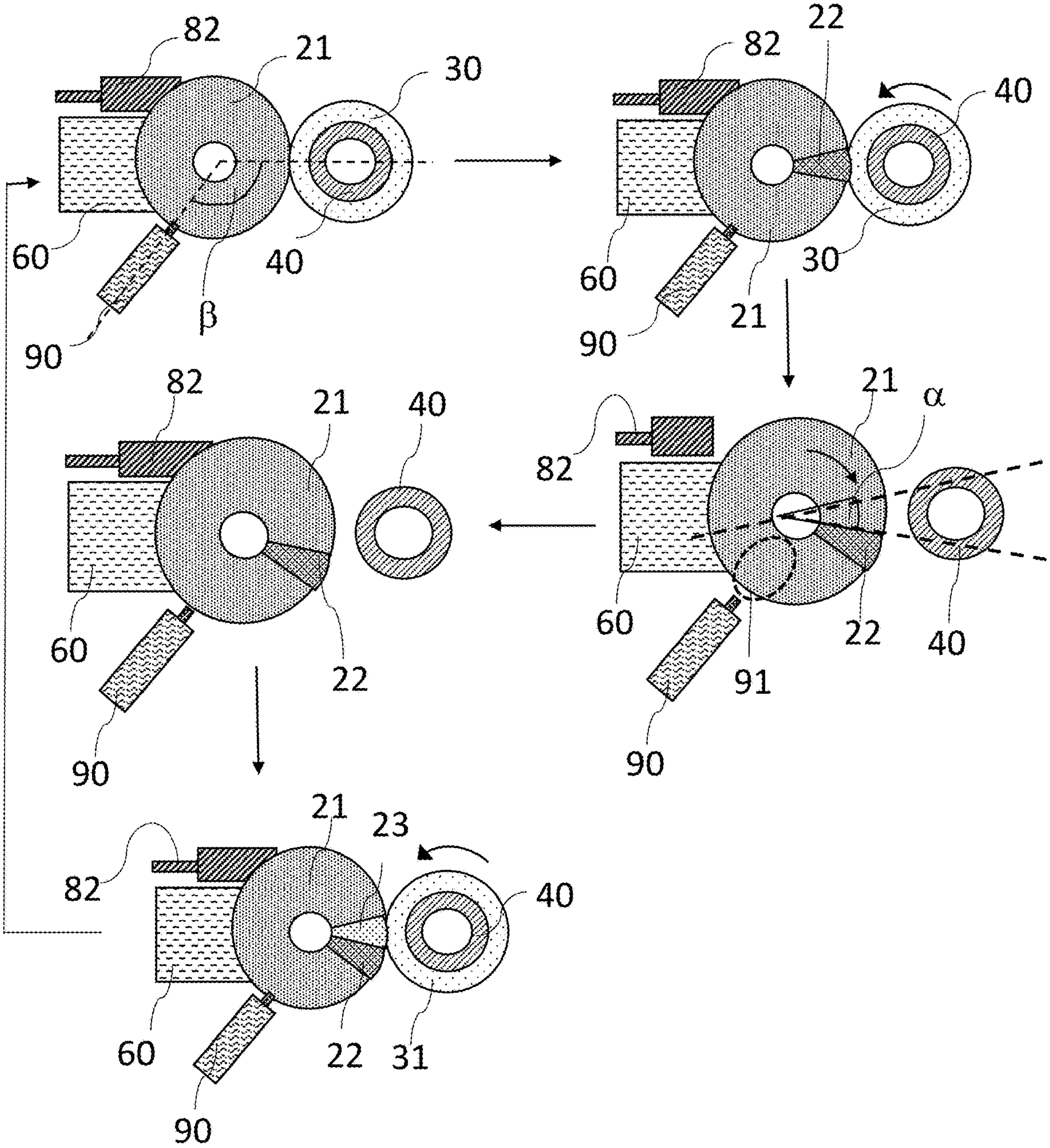
FIG. 5 illustrates a schematic illustration of an exemplary embodiment of a production method provided according to the invention.

FIG. 5 illustrates a schematic illustration of an exemplary embodiment of the forming method provided according to the invention. The apparatus **2*a* in this case corresponds to the apparatus 2 provided according to the invention illustrated in FIGS. 3 and 4. For greater clarity, only one outer shaping roller 21** is depicted.

In step a), a glass workpiece 30 is provided and positioned on the inner molding tool 40, wherein the workpiece has been heated until softening of the glass. The outer molding tool 21 is in the form of a shaping roller having a round cross section and is mounted in a rotatable manner by way of the mounting suspension 60. With the aid of the locking apparatus 82, the shaping roller is fixed.

In step b), the workpiece 30 is molded. To this end, the workpiece 30 is rotated about its center point. The rotary movement is symbolized by the arrow. The inner lateral surfaces of the workpiece 30 are molded by the inner molding tool 40. The molding of the outer lateral surfaces of the workpiece 30 takes place by way of the contact surface 22 of the outer molding tool 21. The contact surface 22 is in this case covered with a lubricant during the molding operation.

After the molding operation, in step c1), the workpiece 30 is removed from the apparatus **2*a*. The locking device 82 is released and the shaping roller 21 is rotated through the predefined angle α. In some embodiments, the angle α corresponds to the angle of the contact surface 22. Subsequently, in step c2), the position of the shaping roller 21 is fixed by locking the locking device 82**.

In addition, in step c), a lubricant is applied to a subregion 91 of the lateral surface of the shaping roller 21 by the apparatus 90. In this case, the lubricant is applied to a subregion 91 of the shaping roller 21 that was not part of the contact face 22 in the preceding step b). This ensures that the subregion 91 is not or is no longer heated up by contact with the hot glass 30 during the application of the lubricant.

Upon repetition of steps a) and b) with a new workpiece 31, a new subregion 23 of the lateral surface of the shaping roller 21 comes into contact with the workpiece 31. Thus, each workpiece is formed with a different subregion of the lateral surface of the shaping roller 21 as contact or shaping surface; the particular shaping surface has thus not been heated up by a prior shaping process, but rather a cold shaping surface is provided in each shaping process. A cold shaping surface is understood in this case in particular as being a shaping surface with a surface temperature less than 250° C.

Figure 6:
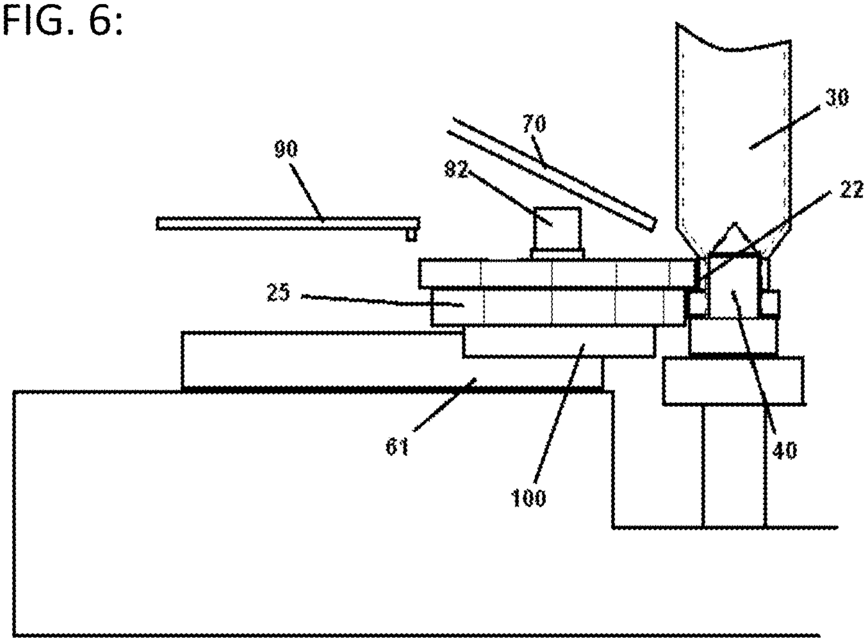
FIG. 6 illustrates a schematic side view of an exemplary embodiment of an apparatus provided according to the invention having an outer shaping roller with a polygonal cross section.
Figure 7:
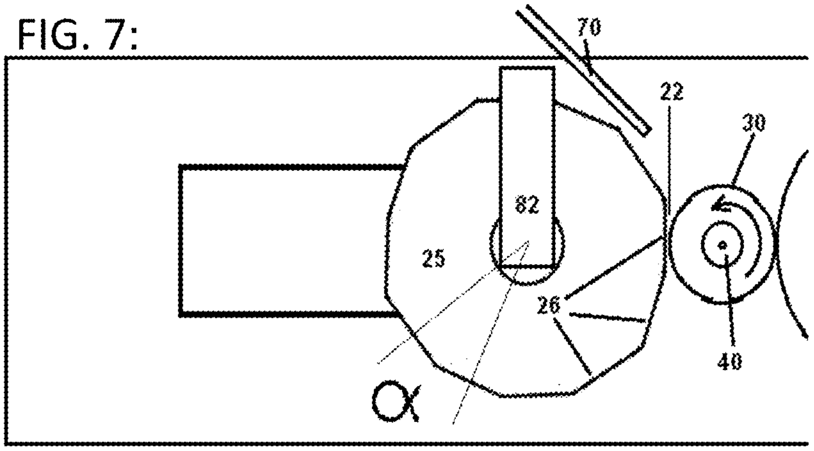
FIG. 7 illustrates a schematic plan view of the apparatus of FIG. 6.

FIGS. 6 and 7 illustrate schematic illustrations of an exemplary embodiment having a shaping roller 25 with a polygonal cross section. The shaping roller shown here has a cross section in the form of a dodecagon. Accordingly, 12 shaping surfaces 26 are present as contact surfaces. Thus, the angle of rotation α, shown in FIG. 5, for this shaping roller is 30°.

Figure 8:
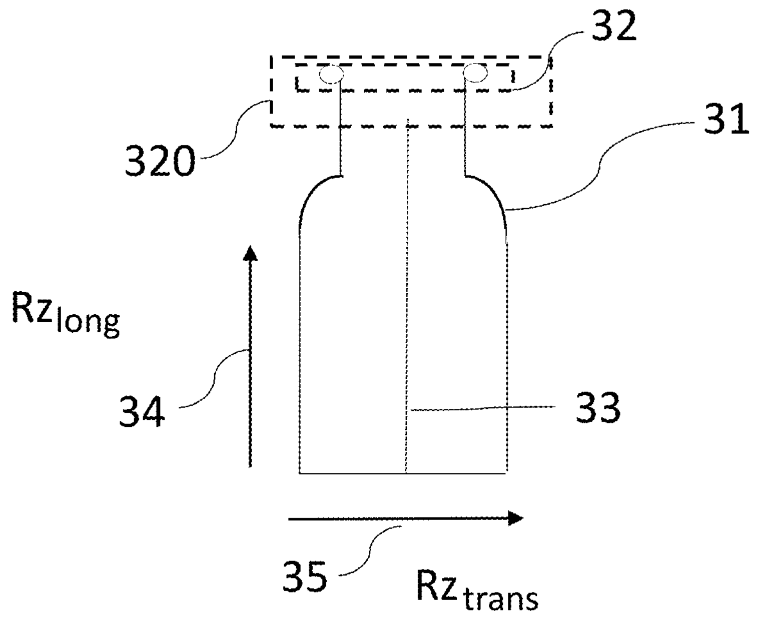
FIG. 8 is a schematic illustration of a glass vial provided according to the invention.

FIG. 8 illustrates a schematic illustration of a formed glass vial 31. The measuring directions for the depth roughnesses $Rz_{long}$ and $Rz_{trans}$ with respect to the longitudinal axis 33 of the glass vial in the measuring region 32 are in this case illustrated by the arrows 34 and 35. In this case, the arrow 34 indicates the axial direction and arrow 35 the tangential direction. The measuring region 32 is in this case located in the characteristic surface region 320. In the exemplary embodiment shown in FIG. 8, the characteristic surface region 320 corresponds to the outer surface of the rolled rim.

Figure 9:
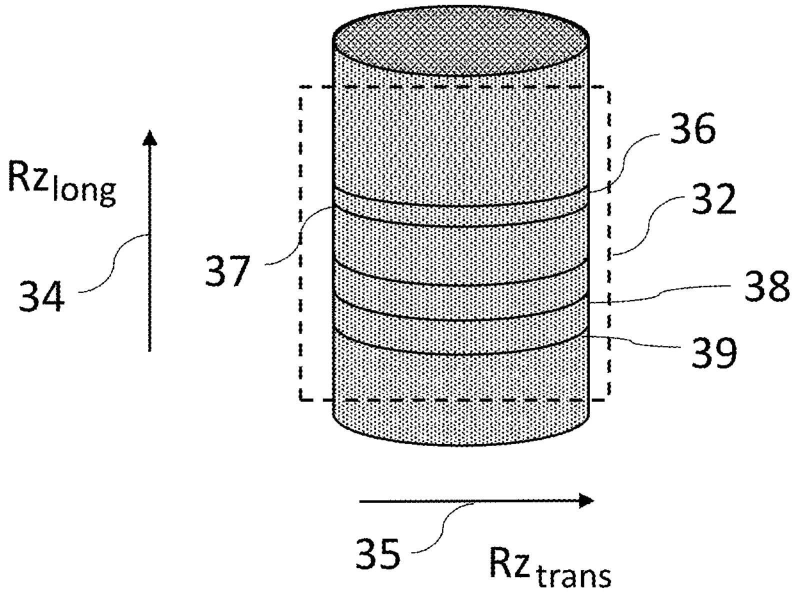
FIG. 9 is another schematic illustration of the glass vial of FIG. 8.

The measuring region 32 is schematically illustrated in FIG. 9. The characteristic surface 320 of the glass vial, i.e. the rolled rim has in this case a plurality of circumferential grooves 36, 37, 38, 39. The grooves or scores 36, 37, 38 and 39 are in this case oriented transversely to the longitudinal axis of the glass vial.

Figure 10:
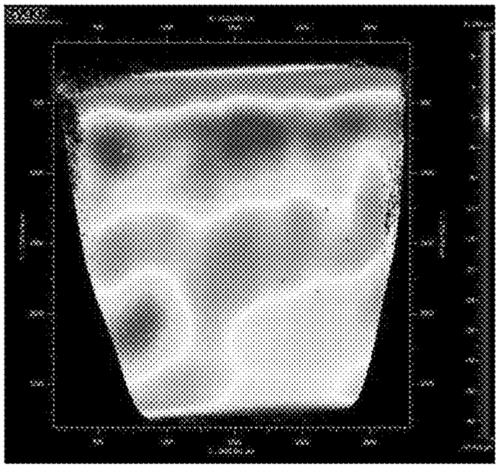
FIG. 10 is an illustration of a 2D height relief of the surface structure of a characteristic surface region of a container known from the prior art.

FIG. 10 illustrates the 2D height profile of the surface structure of a characteristic surface region of a glass vial, known from the prior art, as comparative example. The measuring field has in this case a size of 2 mm×2 mm and was removed from the region of the rolled rim. The 2D height profile is illustrated in this case in greyscale. In this case, the x-axis illustrates the tangential direction and the y-axis the axial direction. It is clear from FIG. 10 that the pattern impressed during the production process does not have a preferred direction. Thus, the pattern or the height profile is as pronounced in the circumferential direction, i.e. in the tangential direction, as it is in the direction of the axis of rotation, i.e. in the axial direction.

Figure 11:
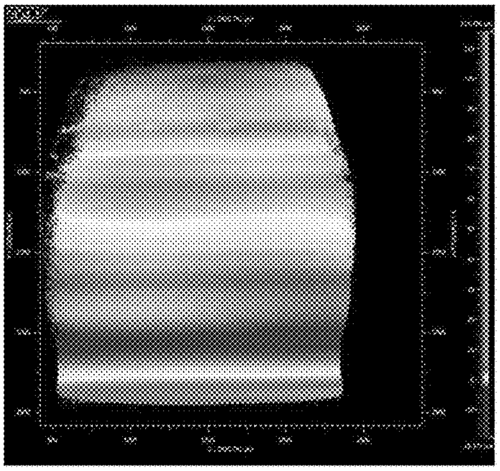
FIG. 11 is an illustration of a 2D height relief of the surface structure of a characteristic surface region of an exemplary embodiment provided according to the invention.

FIG. 11 illustrates a 2D height profile of the characteristic surface region of an exemplary embodiment. Here too, the measuring field has a size of 2 mm×2 mm and was removed from the region of the rolled rim. The 2D height profile is illustrated in this case in greyscale. In this case, the x-axis illustrates the tangential direction and the y-axis the axial direction. In contrast to the height profile shown in FIG. 10, the height profile of the exemplary embodiment has an anisotropic distribution. In this case, portions with the same axial value have identical or virtually identical heights, whereas the relief heights of the measurement points with identical tangential values differ from one another by different axial values.

Figure 13:
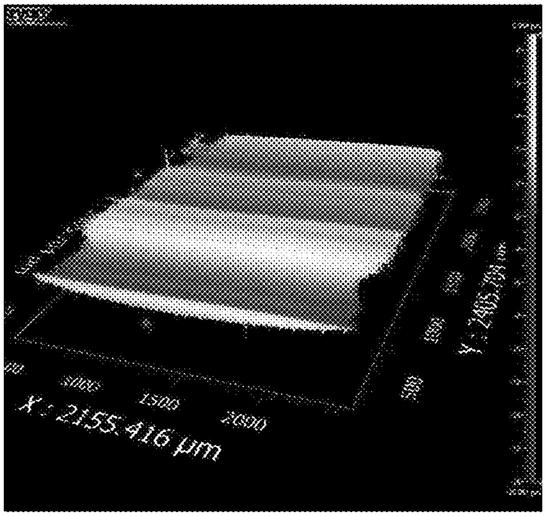
FIG. 13 is an illustration of a 3D height relief of the surface structure of a characteristic surface region of an exemplary embodiment provided according to the invention.

This is attributable to the fact that, in the method provided according to the invention, the deformable glass surface drags over the stationary tool surface and thus scrapes off the film of oil of undefined thickness, with the result that patterns of scores arise in the tangential direction. This is also clear from FIG. 13. FIG. 13 illustrates the 3D height relief, illustrated in greyscale, of the glass surface of the 2 mm×2 mm measuring field. The x-axis in this case indicates the tangential direction and the y-axis the axial direction. A dragging pattern with scores or grooves in the tangential direction is apparent.

Figure 12:
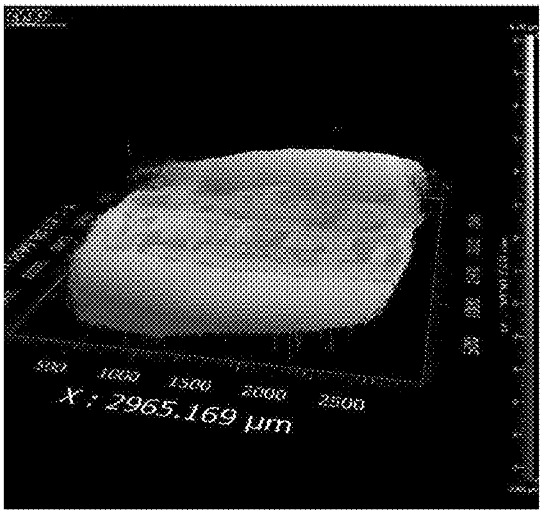
FIG. 12 is an illustration of a 3D height relief of the surface structure of a characteristic surface region of a container known from the prior art.

In contrast thereto, FIG. 12 illustrates the 3D height profile of a characteristic region of the comparative example. Unlike the exemplary embodiment, the comparative example does not illustrate a preferred direction in the height profile. Rather, there is no difference as to how the impressed pattern is formed tangentially and axially.

For the quantitative assessment of the structure of the characteristic surface regions, a total of three measuring regions that were each 1 mm×1 mm in size were selected and a height relief was established by a white light interferometer of the type Zygo NexView Nx2. The individual measuring regions have in this case a tangential distance of 120° from one another and were there distributed uniformly around the entire circumference of the characteristic surface region. Furthermore, the individual measuring regions were oriented such that they were arranged centrally, in an axial direction, in the characteristic surface region.

The height reliefs were measured and corrected computationally in terms of the cylindrical shape of the measuring field on account of the macroscopic shape of the container.

From the height reliefs obtained in this way, the local gradient in the tangential direction and in the axial direction was determined in each case at each point of a height relief. In order to determine the particular mean tangential gradient value and the mean axial gradient value of the particular measuring field, the amounts of the corresponding local gradient values over the entire measuring field were averaged. The corresponding mean gradient values of the individual measuring fields were in turn arithmetically averaged, such that the mean tangential gradient value and the mean axial gradient value were determined as mean values over the three measuring fields.

Figure 14:
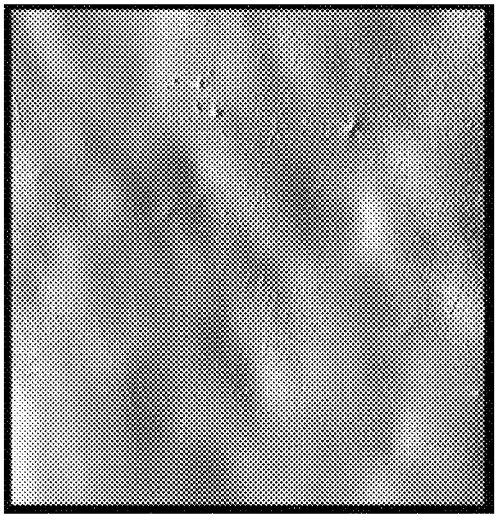
FIG. 14 is a graphical illustration of the gradient analysis of a characteristic surface region of a container known from the prior art in a tangential direction.
Figure 15:
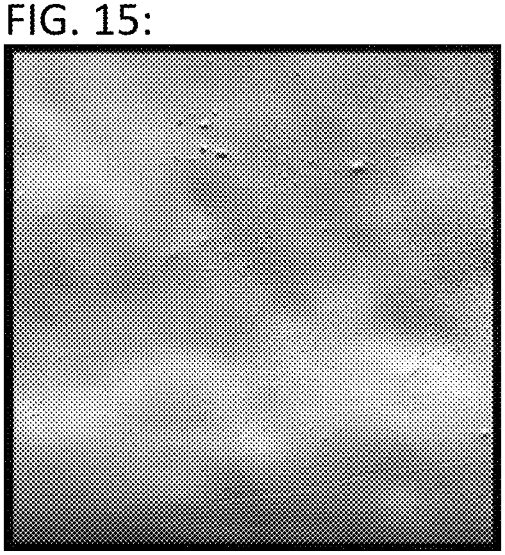
FIG. 15 is a graphical illustration of the gradient analysis of a characteristic surface region of a container known from the prior art in an axial direction.

FIGS. 14 and 15 illustrate the gradient analyses in the tangential direction (FIG. 14) and axial direction (FIG. 15) of the comparative example, wherein the local gradient values are illustrated in greyscale. In the comparative example, the values of the tangential gradient and the axial gradient scarcely differ from one another, i.e. there is no preferred direction or anisotropy with regard to the distribution of the gradients over the measuring field.

Figure 16:
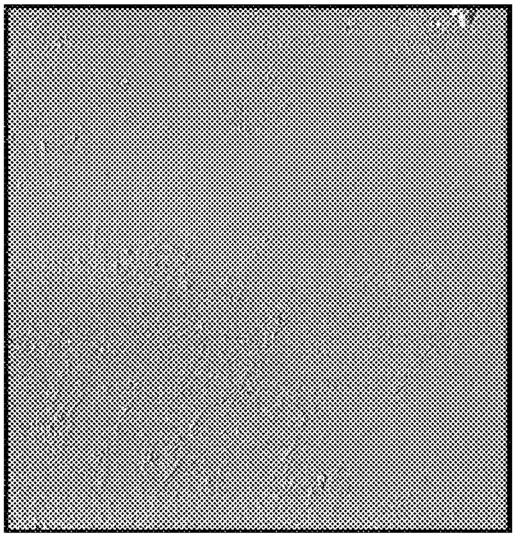
FIG. 16 is a graphical illustration of the gradient analysis of a characteristic surface region of an exemplary embodiment provided according to the disclosure in a tangential direction.
Figure 17:
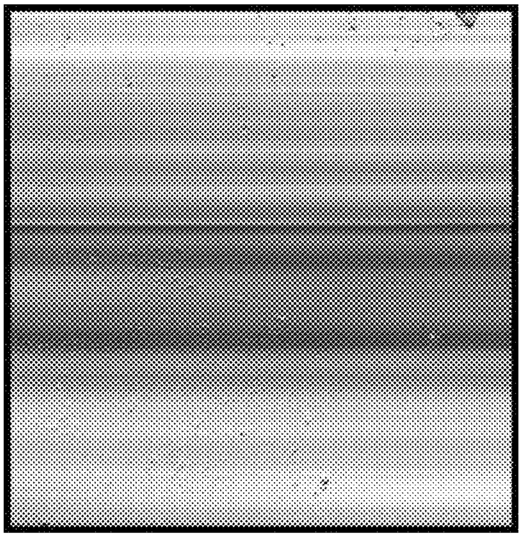
FIG. 17 is a graphical illustration of the gradient analysis of a characteristic surface region of an exemplary embodiment provided according to the disclosure in an axial direction.

In FIGS. 16 and 17, the gradient analysis of the exemplary embodiment is shown, wherein FIG. 16 illustrates the local gradient in the tangential direction and FIG. 17 illustrates the local gradient in the axial direction. The anisotropy of the gradient values is clear from FIGS. 16 and 17. While the gradient in the tangential direction is largely constant, the gradient value in the axial direction varies considerably.

The values of the gradients also depend in this case on the diameter of the characteristic surfaces that are always located on the outer side of the rotationally symmetric container. The smaller the diameter of the surface region used for measurement, the greater the gradients that arise. This is the case both for the gradients in the tangential direction and for those in the axial direction. Table 1 below illustrates measured values for vials with different rolled-rim diameters.

TABLE 1

Mean gradient values depending on rolled-rim diameter and production method

| | Rolled-rim diameter [mm] | Mean tangential gradient value [μm/mm] | Mean axial gradient value [μm/mm] | Mean tangential gradient value/Mean axial gradient value |
|---|---|---|---|---|
| Comparative example 1 | 13 | 3.3 | 4.9 | 0.70 |
| Exemplary embodiment 1 | 13 | 1.6 | 9.1 | 0.20 |
| Comparative example 2 | 20 | 2.4 | 3.4 | 0.69 |
| Exemplary embodiment 2 | 20 | 0.9 | 4.9 | 0.13 |

The gradient values indicated in Table 1 represent the arithmetic means of several samples, wherein the values of the individual samples were determined by arithmetic averaging of measurements on in each case three measuring fields on the outer surface of a rolled rim with a measuring field size of 1 mm×1 mm. In this case, the measuring fields were placed centrally in the axial direction. The three measuring fields of a measurement were in this case placed at a tangential distance of 120° from one another. For each of the three measuring fields of a sample, a gradient analysis was carried out both in the axial direction and in the tangential direction, and the gradients obtained were averaged by integration over the particular measuring field. The comparative examples were produced by a method known from the prior art with movable outer shaping rollers, the exemplary embodiments were produced by the method provided according to the invention.

All the samples were produced with shaping rollers, the contact surfaces of which had an average roughness Ra of 1.6 μm. This is the finest processing stage that can be achieved just by turning.

It is clear from Table 1 that the values of the mean gradients increase with decreasing radius of the rolled rim both in the exemplary embodiments and in the comparative examples.

In contrast to the two comparative examples, the exemplary embodiments have in this case anisotropy with respect to the mean gradient values. Thus, the mean gradient values are much lower in the tangential direction than in the axial direction. Accordingly, the exemplary embodiments also have much lower values for the ratio of the mean tangential gradient value to the mean axial gradient value than the comparative examples.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hollow glass article, wherein the glass article is a container or part of a vessel having a neck or shoulder region and a wall, wherein the glass article encompasses the wall and the neck or shoulder region of the container, wherein the wall has a round or oval cross section and the container has a characteristic surface region on an outer glass surface of the hollow glass article, and wherein the following applies for a ratio between a mean tangential gradient value and a mean axial gradient value in the characteristic surface region: mean tangential gradient value/mean axial gradient value <0.6.

2. The hollow glass article of claim 1, wherein the following applies for the ratio between the mean tangential gradient value and the mean axial gradient value in the characteristic surface region: mean tangential gradient value/mean axial gradient value <0.45.

3. The hollow glass article of claim 1, wherein a height profile in the characteristic surface region exhibits anisotropy.

4. The hollow glass article of claim 1, wherein the characteristic region has portions with increased average roughness $Rz_{axial}$ measured parallel to a longitudinal axis of the glass article, and wherein the portions with increased average roughness $Rz_{axial}$ extend over an entire area of the characteristic region.

5. The hollow glass article of claim 4, wherein at least one portion with increased average roughness $Rz_{axial}$ has at least one encircling groove or score.

6. The hollow glass article of claim 5, wherein the at least one portion comprises a plurality of scores.

7. The hollow glass article of claim 1, wherein the characteristic surface region has portions with a roughness depth $Rz_{axial}$ measured parallel to a longitudinal axis of the glass article that is greater than the roughness depth $Rz_{tangential}$ measured at a height of the wall transversely.

8. The hollow glass article of claim 7, wherein at least one portion has at least one circumferential score or groove.

9. The hollow glass article of claim 8, wherein the at least one portion comprises a plurality of scores.

10. The hollow glass article of claim 1, wherein the glass article is a bottle, a vial, or a part of a carpule, and the characteristic region is formed by an outer surface of a rolled rim, or the glass article is a syringe and the characteristic region is formed by an outer surface of a cone.

11. The hollow glass article of claim 1, wherein the glass article has a tubular portion along its height.

12. The hollow glass article of claim 11, wherein the glass article has a wall thickness with a standard deviation of less than 0.05 mm in the tubular portion.

13. The hollow glass article of claim 11, wherein the characteristic surface region is located outside the tubular portion in an end region of the glass article.

14. The hollow glass article of claim 13, wherein a diameter of the glass article in the characteristic surface region is less than a diameter of the glass article in the tubular portion.

15. The hollow glass article of claim 1, wherein the hollow glass article comprises a borosilicate glass.

* * * * *